Jan. 11, 1927.
J. E. WILSON
POULTRY ROOST
Filed March 12, 1926
1,613,633
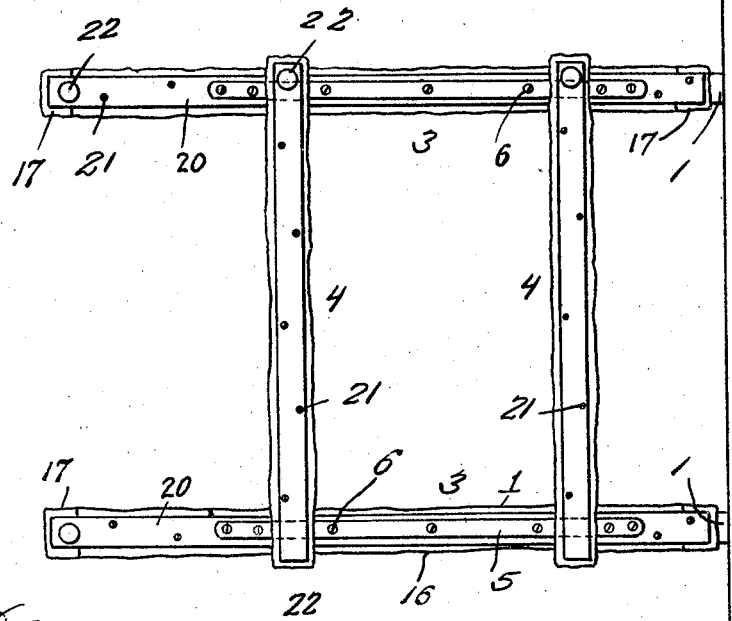
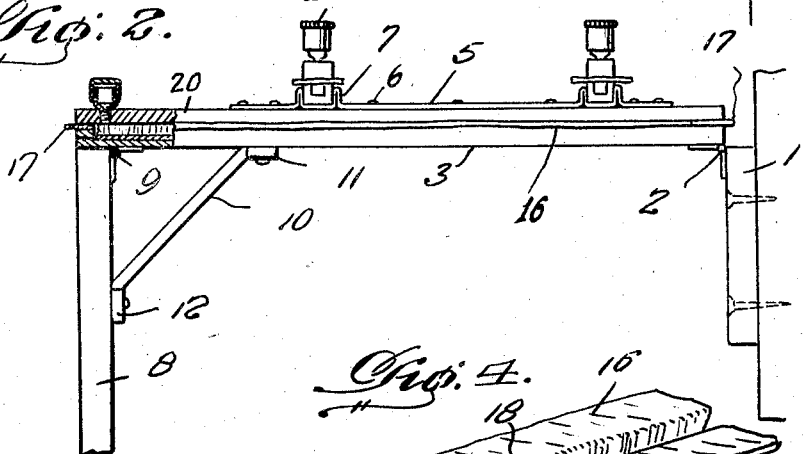
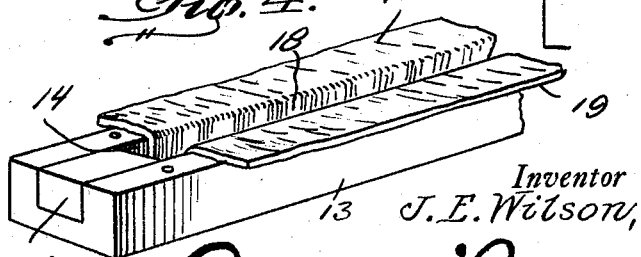
Inventor
J. E. Wilson,
By Clarence A. O'Brien,
Attorney Patented Jan. 11, 1927.

1,613,633

UNITED STATES PATENT OFFICE.

JOHN E. WILSON, OF MACKSVILLE, KANSAS.

POULTRY ROOST.

Application filed March 12, 1926. Serial No. 94,219.

My present invention pertains to poultry roosts of the kind designed to prevent vermin from annoying poultry; and it has for its object to provide a roost which while simple and inexpensive in construction may be depended upon to prevent lice, mites, and other vermin from reaching poultry perched upon the roost.

My invention also contemplates the provision of a construction of roost which will lend itself to ready and thorough cleaning of a poultry house in which my novel roost construction is disposed.

Other objects and practical advantages of the invention will be fully understood from the following description and claims when the same are read in connection with the drawings, accompanying and forming part of this specification, in which:—

Figure 1 is a plan view illustrating the roost construction constituting the best practical embodiment of my invention that I have as yet devised.

Figure 2 is an elevation taken at right angles to Figure 1 and showing a portion of one roost in vertical section.

Figure 3 is an enlarged cross-section taken through one of the roosts of my invention at an intermediate point in the length thereof.

Figure 4 is an enlarged fragmentary perspective showing a portion of one of the roosts of my invention.

Similar numerals of reference designate corresponding parts in all of the views of the drawings.

In the present and preferred embodiment of my invention I affix a bracket 1 or brackets 1 to one wall of a chicken house, and to the said brackets 1, I hingedly connect at 2 two roosts designated by 3, and upon the said roost 3, I superpose roosts 4, spaced apart and disposed at right angles to the roosts 3 and held against casual lateral movement by straps 5 on the roosts 3, the said straps 5 being attached by screws 6 or other appropriate means to the roosts 3 and being provided with integral upstanding portions 7 which form seats in which the roosts 4 are arranged and held against lateral movement. Manifestly the said construction while precluding casual movement of the roosts 4 with respect to the roosts 3, lends itself to ready removal and replacement of the roosts 4 when occasion demands.

The roosts 3 support the roosts 4, and the roosts 3 are supported, in turn, by legs 8 hingedly connected at 9 to the roosts 3 and designed to be detachably secured in position at right angles to the roosts 3 and by inclined braces 10 interposed between and separable from blocks 11 and 12 on the roosts 3 and legs 8, respectively. Manifestly when the braces or struts are removed the legs 8, which normally rest on the floor of a chicken house, may be swung toward the roosts 3 so that the said roosts 3 and the parts carried thereby may be swung or folded into a space of small compass at the side of the poultry house so as to render convenient the cleaning of the poultry house. It will also be appreciated in this connection that after cleaning of the poultry house, the roosts 3 and the parts carried thereby may be swung into a horizontal position, and may then be supported in said position by the legs 8, maintained in position by the braces or struts 10 positioned as described and as best shown in Figure 2.

In general the roosts 3 and 4 are identical in construction, and therefore a detailed description of the roosts 3 shown in Figures 2, 3 and 4 will suffice to impart a definite understanding of all of the roosts constructed in accordance with the chief part of my invention. It will be understood from the said figures that the roost comprises among other elements a body bar 13 having in its upper side a longitudinal channel 14, the ends of which channel are closed by blocks 15, said blocks resting flush with the upper side of the body bar 13. It will also be understood that a wick 16 in sheet form is carried by the body bar 13 and that end wicks 17 are also carried by the said body bar 13. The wick 16 has a pendent loop shaped portion 18 disposed in the channel or well 14 which is designed to receive a liquid disinfectant or vermicide, and the said wick also has wing portions 19 which are superposed upon and extend laterally beyond the sides of the body bar 13 for an important purpose hereinafter set forth. The wicks 17 are superposed upon the body bar 13 and the blocks 15 and extend beyond the ends of the body bar 13 and have portions pendent in the channel or well 14. From the foregoing it follows that the body bar 13 of my novel roost is adequately protected at the sides thereof and also at its ends so that vermin crawling up the sides or crawling up the ends are effectively prevented from reaching poultry perched upon the roosts. Again it will be appreciated that the wicks 16 and 17 may be depended upon to prevent vermin from reaching the feet or feathers of poultry, and this without liability of any of the disinfectant employed being transferred from feathers of the fowls to eggs so as to lessen the market value of the latter.

In addition to the elements named, the roost being described comprises a crown bar 20 superposed upon the body bar 13 and blocks 15 and the wings of the wick 16 and connected to the body bar 13 and the wick wings through the medium of screws 21 or other appropriate means. Carried by the said crown bar 20 is a normally closed oil cup 22 through which oil, liquid vermicide or other appropriate agent may be supplied to the channel or well 14. The said cup 22 may be and preferably is carried by the crown bar 20 and is preferably arranged, for obvious reasons, adjacent to the end of the roost.

It will be apparent from the foregoing that the roosts of my invention are adapted to prevent vermin from reaching the top of the roosts at any point in the length of the roosts and also at the ends thereof which is materially advantageous. It will also be appreciated that the projecting portions of the wicks enable the fumes from the disinfectant or vermicide to pass upwardly into the feathers of the fowl and that when the feathers of the fowl droop over the wicks vermicide will be applied to the feathers so that the likelihood of mites, lice or other vermin reaching fowl on the roosts is reduced to a minimum. It will also be noticed that the wall hinges of my improvement are located at the lower sides of the roosts so that there is absolutely no point at which vermin can travel to the roosts and particularly the upper portions thereof in endeavoring to reach fowl perched upon the roosts, without coming into contact with the wicks.

Manifestly it is within the purview of my invention to form the end wicks 17 integral with the wick 16, though as before intimated it is feasible to form the end wicks 17 separately from the wicks 16 and have depending portions on said wicks 17 and disposed in the channel or well 14 so that capillary traction may be depended upon to keep the extended portions of the wicks 17 as well as the extended portions or wings of the wicks 16 saturated with the liquid vermicide employed.

The seats formed by the flanges 7 of the straps 5 may be and preferably are possessed of resiliency, so that the body bars of the roosts 4 may be sprung into and out of said seats, and so that the roosts 4 will be yieldingly held against casual shifting or displacement.

In addition to the practical advantages ascribed to my novel roost construction, it will be appreciated that the said construction as a whole is simple and inexpensive in construction and is well adapted to withstand the usage to which parts employed in poultry houses are ordinarily subjected.

I have entered into a detailed description of the construction and relative arrangement of the parts embraced in the present and preferred embodiment of my invention in order to impart a full, clear and exact understanding of the said embodiment. I do not desire, however, to be understood as limiting myself to the precise construction shown and described, my invention being defined by my appended claims within the scope of which modifications in structure and in arrangement may be made without departure from my invention.

Having described my invention, what I claim and desire to secure by Letters-Patent, is:—

1. A poultry roost having a well for the reception of liquid disinfectant or vermicide and also having a wick means with a portion disposed in said well and also with a portion extending laterally beyond the roost.

2. A poultry roost having a well for the reception of liquid disinfectant or vermicide and also having wick means with portions disposed in the well and with other portions extending laterally beyond the sides and ends of the roost.

3. A poultry roost comprising a body having a well for the reception of disinfectant, vermicide or the like, wick means having a portion disposed in said well and also having portions superposed upon the body and extending laterally beyond the same, and a crown bar superposed upon the body and the wick means and connected with the body.

4. A poultry roost comprising a body having a well for the reception of disinfectant, vermicide or the like, wick means having a portion disposed in said well and also having portions superposed upon the body and extending laterally beyond the same, and a crown bar superposed upon the body and the wick means and connected with the body; the said crown bar being equipped with an oil cup in communication with the said well of the body.

5. A poultry roost comprising a body bar having in its upper side a longitudinal channel for the reception of liquid disinfectant, vermicide or the like, the said channel being closed at its ends, wick means disposed in the said channel of the body bar and having portions superposed upon the bar and extending laterally beyond the sides thereof and also extending laterally beyond the ends of the bar, a crown bar superposed upon the body bar and the wick means and connected to said body bar, and means through which the channel in the body bar may be supplied with disinfectant, vermicide or the like.

6. In combination, a poultry roost equipped at an intermediate point in its height with laterally extending wick means adapted to be saturated with liquid disinfectant, vermicide or the like, straps superposed upon said roost and having a seat the sides of which are resilient, and a roost disposed in said seat and maintained thereby in a position at an angle to the first-named roost.

7. A poultry roost adapted to contain liquid disinfectant, vermicide or the like, and having at an intermediate point of its height extended wick portions arranged to be saturated by disinfectant, vermicide or the like and adapted to prevent vermin from reaching the top of the roost.

8. A poultry roost adapted to contain liquid disinfectant, vermicide or the like, and having at an intermediate point of its height extended wick portions arranged to be saturated by disinfectant, vermicide or the like and adapted to prevent vermin from reaching the top of the roost; the said roost being provided at its top with a seat for another roost and being combined with the latter roost.

In testimony whereof I affix my signature.

JOHN E. WILSON.